Aug. 10, 1965   I. MARGOLIS   3,199,603
CURVED ROTOR BLADES

Filed Jan. 25, 1965   2 Sheets-Sheet 1

INVENTOR.
ISADORE MARGOLIS
BY
ATTORNEY

Aug. 10, 1965   I. MARGOLIS   3,199,603
CURVED ROTOR BLADES
Filed Jan. 25, 1965   2 Sheets-Sheet 2
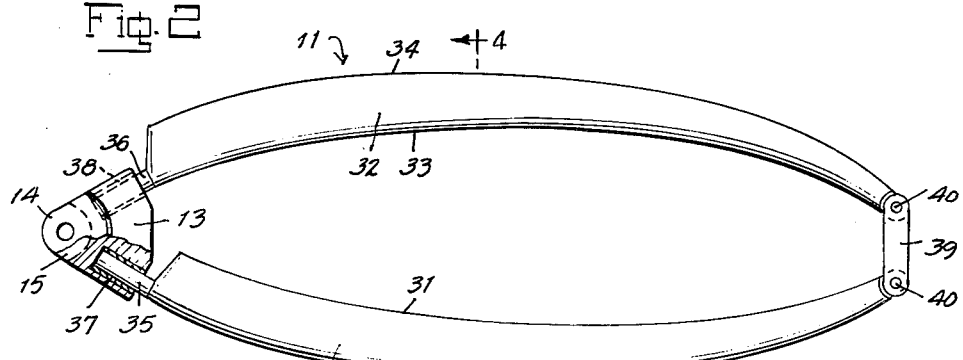
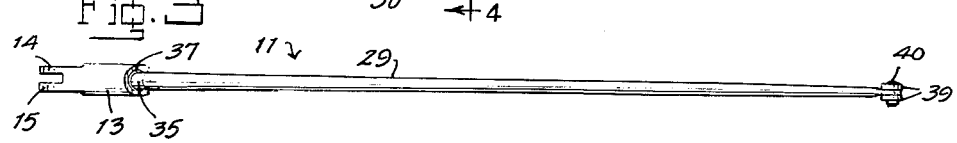
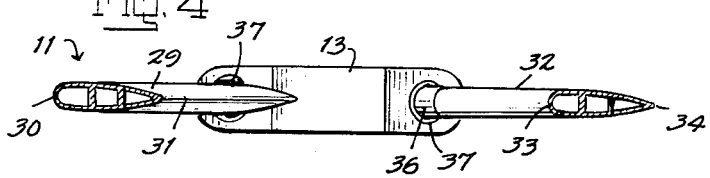
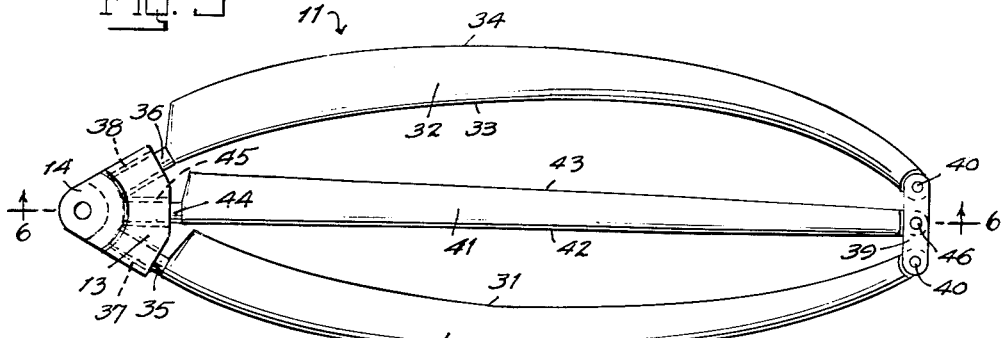
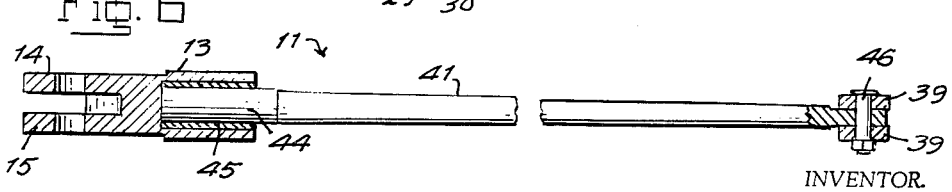
INVENTOR.
ISADORE MARGOLIS
BY
ATTORNEY United States Patent Office 3,199,603
Patented Aug. 10, 1965

3,199,603
CURVED ROTOR BLADES
Isadore Margolis, 151 Prospect Drive, Stratford, Conn.
Filed Jan. 25, 1965, Ser. No. 427,885
9 Claims. (Cl. 170—171)

This is a continuation-in-part of application Serial No. 275,664 filed April 25, 1963 now abandoned.

This invention relates to curved rotor blades, particularly for use in helicopters or other rotating wing aircraft. The main objects of this invention are to provide an improved rotor blade of high efficiency; to provide a rotor blade whose main structural components are very efficiently utilized to save weight; to provide a main structural beam able to withstand dynamic, aerodynamic and vibratory loads; to provide a rotor whose overall diameter for a basic blade area is greatly reduced; and to provide an improved connection of the inboard end of blade components to a supporting socket member.

A further object is to provide a rotor blade comprising a pair of curved air foil beams each having leading and trailing edges, one beam being a leading beam of convex curvature for positive sweepback and the other beam being a trailing beam of concave curvature for negative sweepback, the inboard or root ends of the beams being connected to a supporting socket member and the outboard or tip ends having connection means between them to provide a structurally continuous loop.

A still further object is to provide an improved connection between the air foil beams and the socket member comprising cylindrical shaft ends upon each of the air foil beams engaged for both axial and rotary movement within cylindrical bearings provided in the socket member, with the axes of the shaft ends disposed in angular relation at each side of the longitudinal axis of the rotor blade, whereby as centrifugal and spanwise loads upon the blade are imposed upon the angularly related shaft ends the blade is effectually retained relatively to the supporting socket member while at the same time the shaft ends are free to slide axially and to rotate within their bearings to thus remove axial and torsional stresses in the socket member.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 2 is a plan view partially in section of the curved rotor blade according to the invention;

FIG. 3 is a forward edge elevation;

FIG. 4 is a transverse sectional view on an enlarged scale taken along the line 4—4 of FIG. 2;

FIG. 5 is a plan view of a modified rotor blade according to the invention, including an intermediate straight air foil beam; and FIG. 6 is longitudinal sectional view taken along the line 6—6 of FIG. 5.

Figure 1:
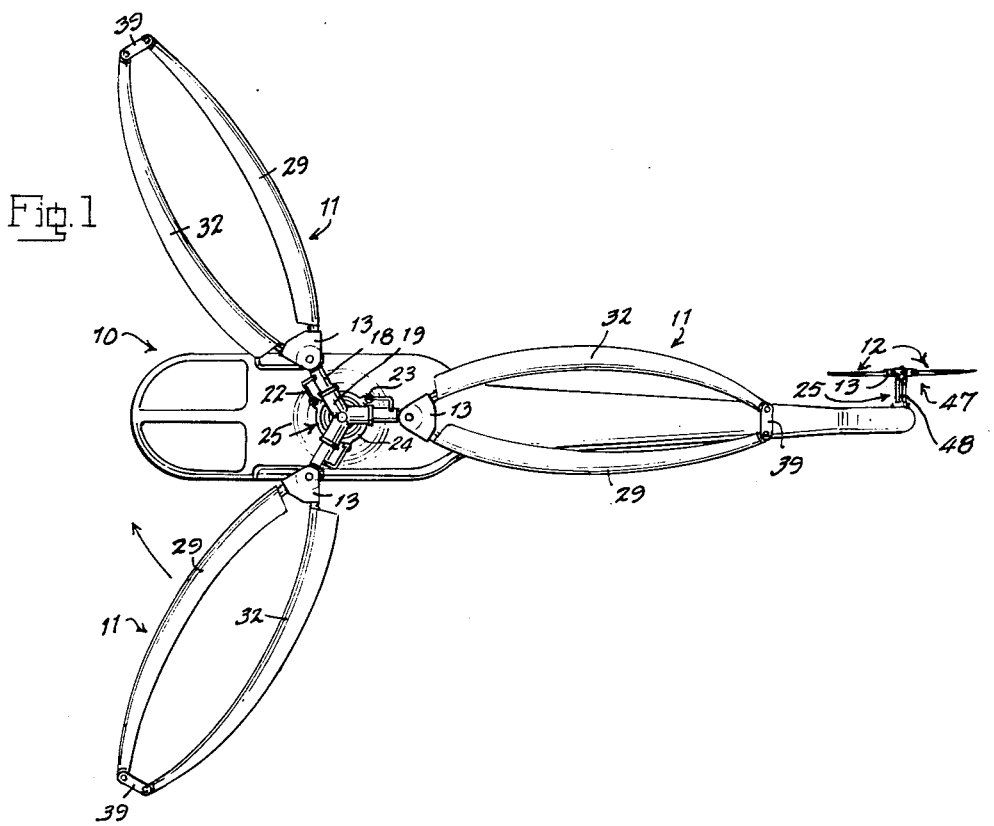
FIG. 1 is a top plan view of a helicopter-type aircraft in which rotor blades according to the invention are incorporated in the rotating wing and the tail rotor.

Referring to the drawings and more particularly to FIG. 1 the curved rotor blades according to the invention are shown incorporated by way of example in a helicopter 10 provided with a main rotating wing, comprising three curved rotor blades 11, and a tail rotor also comprising three curved rotor blades 12. In the illustrated example the curved rotor blades are illustrated as having a limited back and forth or lead and lag swing about vertical axes in the plane of the disk, although it will be understood that other methods of connection with the driving hub may be employed. For example, the blades may be hinged to flap up and down, or to flap up and down as well as to swing back and forth, they may be connected rigidly to a hub which is free to tilt with respect to the driving shaft, or they may be connected rigidly to the driving shaft. These variations are well known in the art and further illustration and description thereof is not deemed necessary.

In the illustrated embodiment each rotor blade includes a socket member 13 at its inboard or root end having clevis lugs 14 and 15 pivotally connected by a pin 16 to a clevis lug 17 of a stub shaft 18, the latter being journaled in one of the three bearing arms 19 of a central hub 20 carried upon the upper end of a drive shaft 21 driven in conventional manner from a motor (not shown). Rotary movement imparted to the stub shafts varies the pitch of the rotor blades, and to this end each stub shaft is provided for example with a rotor blade pitch control horn 22 connected in conventional manner by a link 23 to the upper swash plate 24 of a cyclic and collective pitch control mechanism 25. Such pitch control mechanism is well known so that further illustration is not deemed necessary, it being sufficient to state that tilting of the upper swash plate attains cyclic pitch change, and raising or lowering it attains collective pitch change.

As shown in FIGS. 2–4 the curved rotor blade 11 comprises a forward or leading air foil beam 29 of convex curvature for positive sweepback having a leading edge 30 and a trailing edge 31, and a rearward or trailing air foil beam 32 of concave curvature for negative sweepback having a leading edge 33 and a trailing edge 34. Each of the beams is preferably of conventional air foil cross-section tapering spanwise from the leading to the trailing edge, and also preferably gradually tapered from its inboard to its outboard end, with the cross-sectional air foil shape proportionately diminishing in size from the inboard to the outboard end.

The inboard convergent ends of the beams 29 and 32 are respectively provided with cylindrical shaft ends 35 and 36 engaged within bearing bushings 37 and 38 provided in the socket member 13 along axes which are equally inclined at each side of the longitudinal central axis of the rotor blade, the shaft ends being engaged in the bearing bushings with a press fit permitting both axial sliding and rotary movement therein. In the illustrated embodiment this angular relationship is illustrated as being substantially 30° at each side of the central axis so that the included angle between the two shaft ends is substantially 60°. It will be understood, however, that in practice this angular relationship may be varied, for example with a range of 20° to 45°.

The outboard or tip ends of the two curved beams 29 and 32 are connected by a pair of links 39—39 pivotally secured to the tip ends of the beams by pivot bolts 40—40, so that the combination of the socket member, the two curved beams and the links provides a continuous structural loop in which the two curved beams comprise curved bents. The beams are adapted to be attached to the socket member with the connecting links 39 removed, in which relation the respective beams may have their shaft ends independently inserted in the axial direction of the angularly arranged bearing bushings of the socket member. When the beams are in place the links 39 are connected and in this relation the angular disposition of the shaft ends with respect to the central longitudinal axis of the rotor blade provides a keystone lock against removal of the air foil beams from the socket member. At the same time the shaft ends are free to have axial and rotary movement within the bearing bushings without restraint to axial loads or resistance to torsional moments, thus eliminating axial and torsional stresses between the beams and the socket member as a result of flexing or distortion induced by centrifugal and spanwise loads imposed upon the beams. The linking of the tip ends of the beams also substantially eliminates wing tip flutter and resonance.

In FIGS. 5 and 6 there is shown a modified form of the invention wherein a straight air foil beam 41 having a leading edge 42 and a trailing edge 43 is provided between the curved air foil beams 29 and 32, with its longitudinal axis substantially coinciding with the central longitudinal axis of the rotor blade. The connections to the socket member 13 and the links 39 are substantially similar to the connections of the curved beams, the beam 41 being provided at its inboard end with a cylindrical shaft end 44 having a press fit for rotatable and axial movement in a cylindrical bearing bushing 45 disposed within the socket member 13 intermediate the bearing bushings 37 and 38, and being connected at its tip end to the links 39 by a pivot bolt 46 disposed centrally between the pivot bolts 40—40 connecting the curved beams.

In the case of the tail rotor as seen in FIG. 1, the curved air foil beams of the rotor blades 12 are connected at their inboard ends to a hub assembly 47 mounted on a horizontal drive shaft 48 and including socket members 13 and collective pitch change mechanism 25 substantially similar to socket members 13 and the pitch change mechanism 25 of the main rotating wing.

What is claimed is:

1. A rotor blade for rotary wing aircraft, comprising a forward beam having inboard and outboard ends, a rearward beam spaced rearwardly from said forward beam and having inboard and outboard ends, supporting means for the inboard ends of said beams comprising a socket member having a pair of cylindrical socket bearings opening to the outboard side of said socket member and respectively disposed with their longitudinal axes at outwardly inclined angles laterally at each side of the central longitudinal axis of said socket member, cylindrical shaft extensions respectively carried by said forward and rearward beams at their inboard ends disposed in convergent relation to each other and coaxially engaged within said respective socket bearings for relative rotary and axial movement therein, and connection means connected between the outboard ends of said beams, the central longitudinal axis of said blade being disposed in the space between said forward and rearward beams and extending through said supporting means and said connection means.

2. A rotor blade as defined in claim 1, wherein said inclined angles of said socket bearing axes are of the order of 20°–45° with respect to the longitudinal axis of said blade.

3. A rotor blade as defined in claim 2, wherein said inclined angles of said socket bearing axes are equal and have a common point of intersection with respect to the longitudinal axis of said blade.

4. A rotor blade as defined in claim 1, wherein said connection means comprises connecting link means pivotally connected to the outboard ends of said forward and rearward beams.

5. A rotor blade as defined in claim 1, further characterized by an intermediate beam having inboard and outboard ends, wherein said socket member has an intermediate cylindrical socket bearing intermediate said pair of socket bearings opening to the outboard side of said socket member and having its longitudinal axis substantially parallel to the longitudinal axis of said blade, wherein said intermediate beam has a shaft extension at its inboard end coaxially engaged within said intermediate socket bearing for relative rotary and axial movement therein, and wherein the outboard end of said intermediate beam is connected to said connection means intermediate the outboard ends of said forward and rearward beams.

6. A rotor blade as defined in claim 5, wherein said connection means comprises connecting link means pivotally connected to the outboard ends of said forward, intermediate and rearward beams.

7. A rotor blade as defined in claim 1, wherein said forward beam is of airfoil cross-section having a forward leading edge and a rearward trailing edge and is convexly curved along its longitudinal axis between its inboard and outboard ends for positive sweepback, and said rearward beam is of airfoil cross-section having a forward leading edge and a rearward trailing edge and is concavely curved along its longitudinal axis between its inboard and outboard ends for negative sweepback.

8. The rotor blade as defined in claim 5, wherein said intermediate beam is of airfoil cross-section having a forward leading edge and a rearward trailing edge and having its longitudinal axis straight and substantially parallel to the longitudinal axis of said blade.

9. A rotor blade as defined in claim 8, wherein said forward beam is of airfoil cross-section having a forward leading edge and a rearward trailing edge and is convexly curved along its longitudinal axis between its inboard and outboard ends for positive sweepback, and said rearward beam is of airfoil cross-section having a forward leading edge and a rearward trailing edge and is concavely curved along its longitudinal axis between its inboard and outboard ends for negative sweepback.

References Cited by the Examiner

UNITED STATES PATENTS 2,425,353 8/47 Spitzer.
2,549,407 4/51 Apostolescu _____ 170—159

FOREIGN PATENTS 5,819 of 1893 Great Britain.
134,856 3/52 Sweden.

MARK NEWMAN, *Primary Examiner.*

JULIUS E. WEST, *Examiner.*